(12) United States Patent
Sutton et al.

(10) Patent No.: US 11,754,147 B2
(45) Date of Patent: Sep. 12, 2023

(54) COMPACT GEARBOX AND E-REVERSE

(71) Applicant: McLaren Automotive Limited, Woking (GB)

(72) Inventors: John Henry Sutton, Woking (GB); Michael Kerr, Thatcham (GB)

(73) Assignee: McLaren Automotive Limited, Woking (GB)

( * ) Notice: Subject to any disclaimer, the term of this patent is extended or adjusted under 35 U.S.C. 154(b) by 0 days.

(21) Appl. No.: 17/751,791

(22) Filed: May 24, 2022

(65) Prior Publication Data
US 2022/0282772 A1    Sep. 8, 2022

Related U.S. Application Data (63) Continuation of application No. 16/091,942, filed as application No. PCT/GB2017/050989 on Apr. 10, 2017, now Pat. No. 11,371,587.

(30) Foreign Application Priority Data

Apr. 8, 2016   (DE) ................ 20 2016 101 867.6

(51) Int. Cl.
*F16H 3/00* (2006.01)
*B60K 6/387* (2007.10)
(Continued)

(52) U.S. Cl.
CPC ............ *F16H 3/006* (2013.01); *B60K 6/387* (2013.01); *B60K 6/48* (2013.01); *B60K 6/547* (2013.01);
(Continued)

(58) Field of Classification Search
CPC .... F16H 3/006; F16H 3/093; F16H 2003/008; F16H 2003/0931; F16H 2200/0021;
(Continued)

(56) References Cited

U.S. PATENT DOCUMENTS 627,383 A    6/1899   Birrell
7,021,169 B2   4/2006   Kobayashi
(Continued)

FOREIGN PATENT DOCUMENTS

CN     204164278      2/2015
DE    102008010039    10/2008
(Continued)

OTHER PUBLICATIONS

DE German Search Report, with translation thereof, for corresponding Appl No. 20 2016 101 867.6, dated Dec. 7, 2016, 5 pages (with English translation).
(Continued)

*Primary Examiner* — William C Joyce
(74) *Attorney, Agent, or Firm* — Fish & Richardson P.C.

(57) ABSTRACT

A gearbox comprising: an outer intermediate shaft carrying a first set of shaft gears; an inner intermediate shaft carrying a second set of shaft gears, the inner intermediate shaft running concentrically within the outer intermediate shaft; a first lay shaft carrying a first set of drive gears and an output gear positioned along the first lay shaft between two of the first set of drive gears, a second lay shaft carrying a second set of drive gears and an output gear positioned along the second lay shaft between two of the second set of drive gears, each drive gear being coupled to a respective shaft gear to together provide a plurality of gear ratios between the intermediate shafts and the output shaft; and an output shaft, each lay shaft being coupled to the output shaft by the respective output gear.

20 Claims, 3 Drawing Sheets

(51) Int. Cl.
  *B60K 6/48* (2007.10)
  *B60K 6/547* (2007.10)
  B60K 6/54 (2007.10)
  F16H 3/093 (2006.01)
  F16H 57/02 (2012.01)

(52) U.S. Cl.
  CPC  *B60K 2006/4825* (2013.01); *B60K 2006/541* (2013.01); *B60Y 2400/428* (2013.01); *F16H 2003/008* (2013.01); *F16H 2003/0931* (2013.01); *F16H 2057/02043* (2013.01); *F16H 2057/02086* (2013.01); *F16H 2200/006* (2013.01); *F16H 2200/0021* (2013.01); *Y02T 10/62* (2013.01)

(58) Field of Classification Search
  CPC ..... F16H 2200/006; B60K 6/387; B60K 6/48; B60K 6/547; B60K 2006/4825; B60K 2006/541
  See application file for complete search history.

(56) References Cited

U.S. PATENT DOCUMENTS

| | | | |
|---|---|---|---|
| 7,870,804 | B2 | 1/2011 | Bjorck et al. |
| 8,297,141 | B2 | 10/2012 | Cimatti et al. |
| 9,897,194 | B2 | 2/2018 | Barone et al. |
| 11,371,587 | B2 | 6/2022 | Sutton et al. |
| 11,401,999 | B2 | 8/2022 | Sutton et al. |
| 2008/0202265 | A1 | 8/2008 | Hendrickson et al. |
| 2009/0249907 | A1 | 10/2009 | Singh et al. |
| 2010/0132492 | A1 | 6/2010 | Holmes |
| 2010/0179024 | A1 | 7/2010 | Holmes |
| 2011/0017015 | A1* | 1/2011 | Cimatti ............... F16H 61/0028  903/909 |
| 2012/0174707 | A1 | 7/2012 | Ross et al. |
| 2012/0272760 | A1 | 11/2012 | Mellet et al. |
| 2013/0133451 | A1 | 5/2013 | Schneider et al. |
| 2013/0337972 | A1 | 12/2013 | Lee et al. |
| 2015/0167785 | A1 | 6/2015 | Lee et al. |
| 2016/0076626 | A1 | 3/2016 | Hose et al. |
| 2016/0082821 | A1 | 3/2016 | Mueller et al. |
| 2016/0341285 | A1 | 11/2016 | Gwon et al. |
| 2018/0106330 | A1 | 4/2018 | Gwon et al. |
| 2019/0120327 | A1 | 4/2019 | Byrne et al. |
| 2019/0128380 | A1 | 5/2019 | Sutton et al. |

FOREIGN PATENT DOCUMENTS

| | | |
|---|---|---|
| DE | 112009001348 | 1/2012 |
| DE | 102010037451 | 3/2012 |
| DE | 102011051360 | 12/2012 |
| DE | 102011088602 | 6/2013 |
| DE | 102013111474 | 4/2015 |
| DE | 202014104722 | 1/2016 |
| EP | 2428699 | 12/2014 |
| EP | 3147148 | 3/2017 |
| GB | 2513607 | 11/2014 |

OTHER PUBLICATIONS

EP European Office Action in European Appln. No. 17717846.4, dated Jul. 2, 2020, 4 pages.

EP Office Action in European Appln. No. 17717846.4, dated Dec. 3, 2020, 5 pages.

GB Search Report in Great Britain Appln. No. GB1818277.9, dated Mar. 29, 2021, 4 pages.

International Search Report and Written Opinion from the counterpart PCT Application No. PCT/GB2017/050989, dated Jul. 12, 2017 (12 pages).

International Search Report from the counterpart PCT Application No. PCT/EP2017/058283, dated Jul. 17, 2017 (2 pages).

Translation of the Written Opinion from the counterpart PCT Application No. PCT/EP2017/058283, dated Jul. 17, 2017, 4 pages.

* cited by examiner

FIG. 1

*PRIOR ART*

COMPACT GEARBOX AND E-REVERSE

CROSS-REFERENCE TO RELATED APPLICATIONS

This application is a continuation application of and claims the benefit of priority under 35 U.S.C. § 120 to U.S. application Ser. No. 16/091,942, filed on Oct. 5, 2018, which is the national stage of PCT Application No. PCT/GB2017/050989, filed on Apr. 10, 2017, which claims priority to German Application No. DE 20 2016 101 867.6, filed on Apr. 8, 2016. The contents of each application is hereby incorporated by reference.

TECHNICAL FIELD

This invention relates to a gearbox and to a vehicle comprising first and second power sources.

BACKGROUND

A typical road vehicle has a source of drive, such as an internal combustion engine, which is connected to the vehicle's wheels through a gearbox. The road vehicle may have a hybrid powertrain in which case the source of drive may be an internal combustion engine working in conjunction with at least one electric machine that can operate as an electric motor. The gearbox allows the driver to select the drive ratio between an output shaft of the power source and a drive shaft leading to the wheels.

SUMMARY

Figure 1:
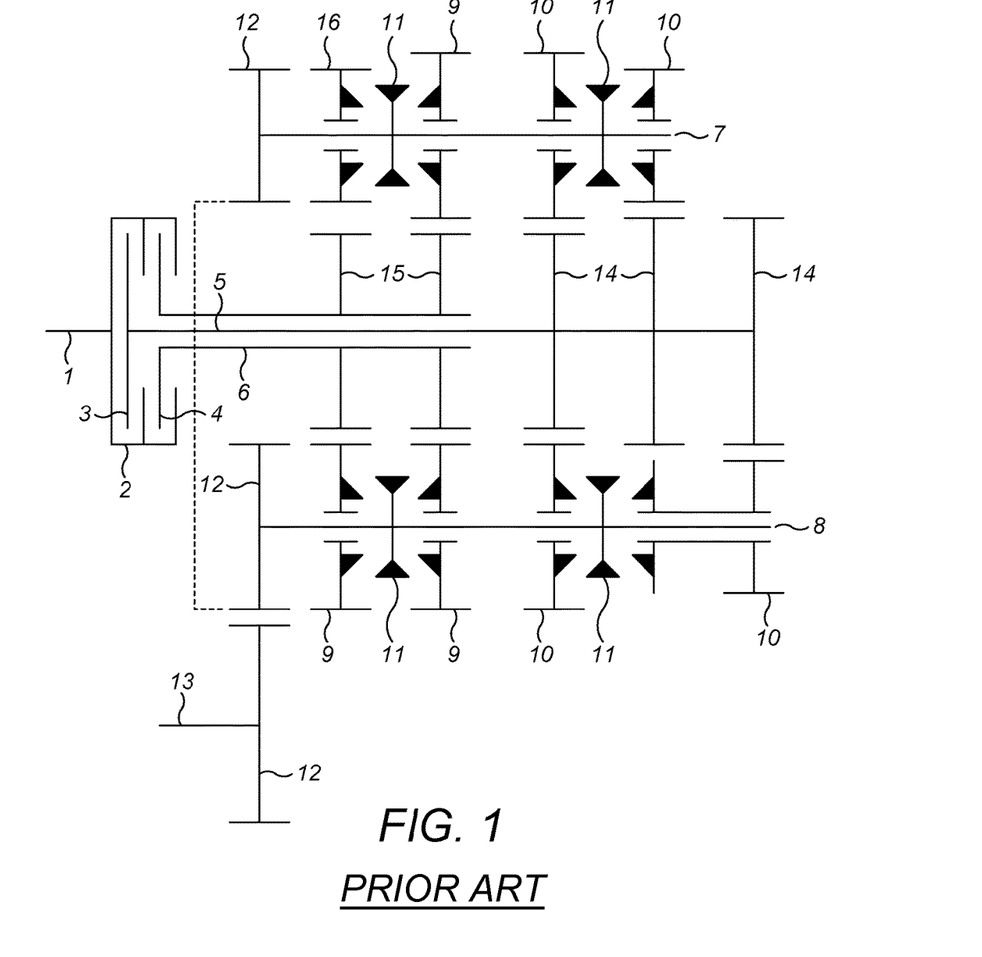
FIG. 1 shows a conventional dual-clutch gearbox.

Increasing numbers of vehicles have dual clutch transmissions (DCTs). FIG. 1 shows a conventional DCT gearbox. The gearbox has a driven shaft 1 which is connected to the crankshaft of an engine. The driven shaft is connected to a clutch housing 2 so that the clutch housing rotates with the driven shaft. The clutch housing contains a pair of main clutches 3, 4. The main clutches are arranged so that they can be actuated independently to couple the driven shaft to either an inner intermediate shaft 5 or an outer intermediate shaft 6. The inner intermediate shaft runs concentrically within the outer intermediate shaft. The gearbox has two lay shafts 7, 8. Each lay shaft carries a number of drive gears 9, 10. The drive gears can spin freely about their lay shaft or can be coupled to their lay shaft by a respective dog clutch 11.

The lay shafts are coupled by output gears 12 to a drive shaft 13 leading to the wheels of the vehicle. The output gear 12 carried by lay shaft 7 is connected to the output gear 12 carried by drive shaft 13 as shown by the dotted line that runs between the output gears 12. The position of output gear 12 carried by drive shaft 13 would in practice be positioned out of the plane of the page of FIG. 1 so as to connect to both other output gears 12. The output gears 12 are shown as being connected to the layshafts 7, 8 at their ends closest to the clutches 3, 4. The output gears 12 could be connected to the layshafts 7, 8 at their ends farthest from the clutches 3, 4.

The inner intermediate shaft 5 carries shaft gears 14 which mesh with drive gears 10. The ratios provided by gears 14 and 10 in combination implement a first set of gear ratios between the driven shaft 1 and the drive shaft 13. A selected one of those gear ratios can be implemented by actuating main clutch 3 so as to couple the drive shaft 1 to the inner intermediate shaft 6 and by actuating one of the dog clutches 11 so as to couple the appropriate one of the drive gears 10 to one of the lay shafts. Similarly, the outer intermediate shaft 6 carries shaft gears 15 which mesh with drive gears 9 to implement a second set of gear ratios between the driven shaft 1 and the drive shaft 13. Lay shaft 7 is also shown as carrying a drive gear 16 that functions as a reverse gear. Not shown in FIG. 1 is a further reverser gear that connects drive gear 16 to its respective shaft gear 15. This reverser gear causes layshaft 7 to rotate in the opposite rotational direction when reverse gear 16 is engaged, for a given rotational direction on driven shaft 1, compared to the other gears carried by layshaft 7. As with output gear 12 carried by drive shaft 13, the reverser gear may be positioned out of the plane of the page of FIG. 1.

Successive gear ratios alternate between the first set and the second set so that, for example, the inner intermediate shaft provides even gear ratios and the outer intermediate shaft carries odd gear ratios. That characteristic allows the gearbox to provide quick up and down shifts. When drive is being provided through one gear, the next gear ratio up or down can be pre-selected by actuating the appropriate dog clutch 11 to couple the drive gear for the next gear ratio to its lay shaft. Then the main clutches can be operated so as to decouple the intermediate shaft for the active gear ratio from the driven shaft and to couple the intermediate shaft for the next gear ratio to the driven shaft. Those operations of the main clutches can be done quickly, or even in an overlapping way, allowing the gearbox to provide substantially uninterrupted power during shifts.

Thus, this design of gearbox can be capable of providing smooth and fast gearshifts.

However, there is a general desire for these gearboxes to include a larger number of gear ratios. This may be to improve performance, driveability, comfort and/or emissions. The increase in gear ratios can increase the overall length of such gearboxes due to more drive gears 9, 10 and more shaft gears being required to be carried by the layshafts 7, 8 and intermediate shafts 5, 6. Such increased length can be problematic as it increases the size within the vehicle that is required for such a gearbox. This increase in size may mean the width of a vehicle needs to be increased in a transverse engine vehicle. This increase in size can also be problematic for mid- and rear-engine vehicles because it can increase the overall length of the vehicle which may not be desirable for performance reasons such as handling.

Therefore, there is a need for alternative designs of gearbox and designs of vehicle.

According to a first aspect of the present invention there is provided a gearbox comprising: an outer intermediate shaft carrying a first set of shaft gears; an inner intermediate shaft carrying a second set of shaft gears, the inner intermediate shaft running concentrically within the outer intermediate shaft; a first lay shaft carrying a first set of drive gears and an output gear positioned along the first lay shaft between two of the first set of drive gears, a second lay shaft carrying a second set of drive gears and an output gear positioned along the second lay shaft between two of the second set of drive gears, each drive gear being coupled to a respective shaft gear to together provide a plurality of gear ratios between the intermediate shafts and the output shaft; and an output shaft, each lay shaft being coupled to the output shaft by the respective output gear.

The output gears of the first and second lay shafts may be positioned so that the drive gears of the first and second sets that are coupled to shaft gears carried by the outer intermediate shaft are to one side, along the respective lay shaft, of the output gears of the first and second lay shafts and the drive gears of the first and second sets that are coupled to shaft gears carried by the inner intermediate shaft are to the other side, along the respective lay shaft, of the output gears of the first and second lay shafts. The gearbox may comprise at least two drive gears to each side of the output gear of the first lay shaft. The gearbox may comprise at least two drive gears to each side of the output gear of the second lay shaft.

The gearbox may comprise a plurality of coupling mechanisms. The coupling mechanisms may be configured to selectively couple at least one respective drive gear to the lay shaft of the drive gear. The coupling mechanisms may have a first mode in which the coupling mechanism couples a respective first drive gear to the lay shaft that carries the drive gear, and a second mode in which the coupling mechanism permits the first drive gear to rotate freely about the lay shaft. At least one coupling mechanism may have a third mode in which the coupling mechanism couples a respective second drive gear to the lay shaft that carries the first drive gear and permits the first drive gear to rotate freely about the lay shaft, and the first mode may permit the second drive gear to rotate freely about the lay shaft. At least two drive gears on a lay shaft may share a common coupling mechanism for selectively coupling the two drive gears to the layshaft. The drive gears on the first lay shaft may be divided into pairs and each pair shares a common coupling mechanism for selectively coupling the drive gears to the first lay shaft. The drive gears on the second lay shaft may be divided into pairs and each pair may share a common coupling mechanism for selectively coupling the drive gears to the second lay shaft. The output gears of the first and second lay shafts may be positioned so that the output gears are not between two drive gears being selectively coupled to the respective lay shaft by a common coupling mechanism.

The first set of shaft gears may be coupled to respective drive gears to provide a first set of gear ratios of the plurality of gear ratios, and the second set of shaft gears may be coupled to respective drive gears to provide a second set of gear ratios of the plurality of gear ratios. Successive gear ratios may alternate between the first set of gear ratios and the second set of gear ratios.

Each of the plurality of gear ratios may have the same rotational relationship between a rotation of the intermediate shafts and a rotation of the output shaft. A rotation of each intermediate shaft in one rotational direction may cause the output shaft to rotate in the same rotational direction at each of the plurality of gear ratios. The rotation of each intermediate shaft in a first rotational direction may cause the output shaft to rotate in an opposite direction to the first rotational direction at each of the plurality of gear ratios. The output shaft may be coupled to an output gear, and the output gear of the output shaft may be coupled to each of the output gears of the first and second lay shafts.

The gearbox may comprise: an input shaft; a first main clutch having a first mode in which the first main clutch provides for positive torque transfer from the input shaft to the outer intermediate shaft and a second mode in which the first main clutch permits independent motion of the input shaft and the outer intermediate shaft; and a second main clutch having a first mode in which the second main clutch provides for positive torque transfer from the input shaft to the inner intermediate shaft and a second mode in which the second main clutch permits independent motion of the input shaft and the inner intermediate shaft.

According to a second aspect of the present invention there is provided vehicle comprising: a transmission comprising an input shaft configured to rotate in a first rotational direction and second rotational direction opposite to the first rotational direction; a first power source comprising a first drive shaft, the first power source being configured to cause the first drive shaft to rotate in a third rotational direction; a second power source comprising a second drive shaft coupled to the input shaft, the second power source being configured to cause the second drive shaft to rotate in the third rotational direction and a fourth rotational direction opposite to the fourth rotational direction; a first clutch having a first mode in which the first clutch provides for torque transfer between the first drive shaft and the second drive shaft and a second mode in which the first clutch permits independent motion of the first drive shaft and the second drive shaft; wherein the vehicle is configured to cause the first clutch to enter the first mode to permit the first power source to cause the input shaft to rotate in the first rotational direction, and cause the first clutch to enter the second mode to permit the second power source to cause the input shaft to rotate in the second rotational direction.

The vehicle may be configured to cause the first clutch to enter the second mode to permit the second power source to cause the input shaft to rotate in the first rotational direction independently of the first power source. When the first clutch is in the first mode, the first power source and second power source may together cause the input shaft to rotate in the first rotational direction.

The transmission may comprise an output shaft, wherein the transmission may be configured to provide drive from the input shaft to the output shaft at a plurality of gear ratios, and at each gear ratio a rotation of the input shaft in the first rotational direction may cause a rotation of the output shaft in a particular same rotational direction for each gear ratio. At each gear ratio a rotation of the input shaft in the first rotational direction may cause a rotation of the output shaft in the first rotational direction. At each gear ratio a rotation of the input shaft in the first rotational direction may cause a rotation of the output shaft in the second rotational direction.

The vehicle may be configured to cause the first clutch to enter the first mode to permit the first power source to cause the vehicle to move in a primary motion direction of the vehicle. The vehicle may be configured to cause the first clutch to enter the second mode to permit the second power source to cause the vehicle to move in a reverse motion direction of the vehicle. The vehicle may be configured to cause the first clutch to enter the second mode to permit the second power source to cause the vehicle to move in the primary motion direction of the vehicle independently of the first power source. The second drive shaft may be coupled to the first clutch and input shaft by a transfer mechanism.

The first power source may be an internal combustion engine configured to provide a drive torque to the first drive shaft. The first power source may be an internal combustion engine configured to provide a drive torque to the first drive shaft and/or receive a drive torque therefrom. The second power source may be an electric motor configured to provide a drive torque to the second drive shaft. The second power source may be an electric motor configured to provide a drive torque to the second drive shaft and/or receive a drive torque therefrom.

When the first clutch is in the first mode, a rotation of the first drive shaft in the third rotational direction may cause the input shaft to rotate in the first rotational direction. A rotation of the second drive shaft in one of the third and fourth rotational directions may cause the input shaft to rotate in the first rotational direction, and a rotation of the second drive shaft in the other of the third and fourth rotational directions may cause the input shaft to rotate in the second rotational direction. The vehicle may comprise a gearbox as described herein as the transmission.

DESCRIPTION OF DRAWINGS

The present invention will now be described by way of example with reference to the accompanying drawings. In the drawings.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

One aspect of the present invention relates to a gearbox comprising an outer intermediate shaft carrying a first set of shaft gears and an inner intermediate shaft carrying a second set of shaft gears, the inner intermediate shaft running concentrically within the outer intermediate shaft. The gearbox comprises a first lay shaft carrying a first set of drive gears and an output gear positioned along the first lay shaft between two of the first set of drive gears, and a second lay shaft carrying a second set of drive gears and an output gear positioned along the second lay shaft between two of the second set of drive gears, where each drive gear is coupled to a respective shaft gear to together provide a plurality of gear ratios between the intermediate shafts and the output shaft. The gearbox also comprises an output shaft, each lay shaft being coupled to the output shaft by the respective output gear.

Another aspect of the present invention relates to a vehicle comprising a transmission comprising an input shaft configured to rotate in a first rotational direction and a second rotational direction opposite to the first rotational direction, a first power source comprising a first drive shaft, the first power source being configured to cause the first drive shaft to rotate in a third rotational direction, and a second power source comprising a second drive shaft coupled to the input shaft, the second power source being configured to cause the second drive shaft to rotate in the third rotational direction and a fourth rotational direction opposite to the fourth rotational direction. The first power source may only be capable of driving the first drive shaft in the third rotational direction. The second power source may be capable of driving the second drive shaft in both the third rotational direction and the fourth rotational direction opposite to the third rotational direction. The vehicle comprises a first clutch having a first mode in which the first clutch provides for torque transfer between the first drive shaft and the second drive shaft and a second mode in which the first clutch permits independent motion of the first drive shaft and the second drive shaft, wherein the vehicle is configured to cause the first clutch to enter the first mode to permit the first power source to cause the input shaft to rotate in the first rotational direction, and cause the first clutch to enter the second mode to permit the second power source to cause the input shaft to rotate in the second rotational direction.

An internal combustion engine to which the principles described herein may apply is not limited in its configuration and could be a straight, flat or V-engine having any number of cylinders.

Figure 2:
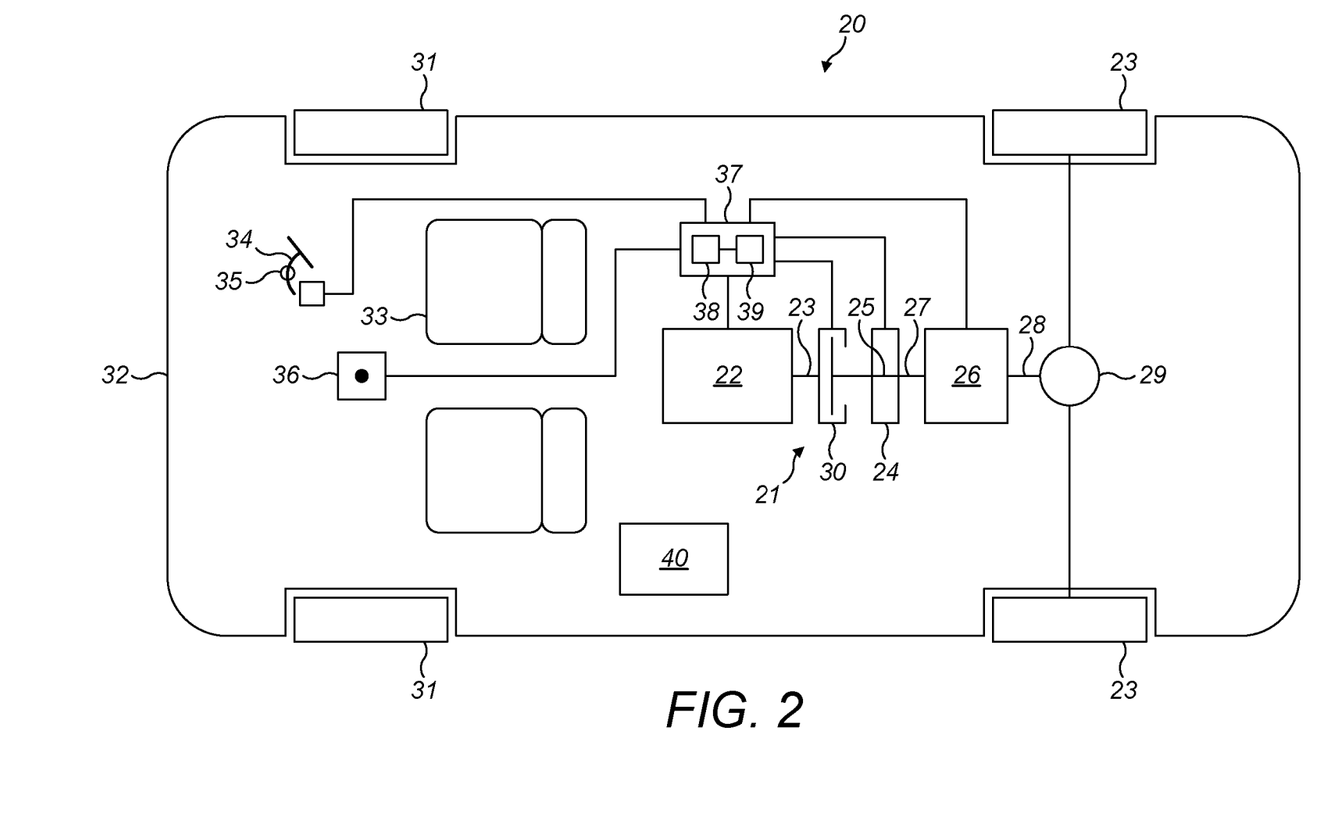
FIG. 2 shows a schematic drawing of a vehicle.

FIG. 2 shows a vehicle 20. Vehicle 20 comprises a drivetrain 21. The drivetrain 21 comprises a first power source 22. The first power source 22 may be an internal combustion engine 22. The first power source 22 may be coupled to at least one wheel 23 of the vehicle 20 by other elements of the drivetrain 21 for the transference of a first power source torque, generated by the first power source 22, from the first power source 22 to the drive wheels 23 of the vehicle 20.

The vehicle may comprise a plurality of wheels 23, 31 for supporting the vehicle 1 on a surface. Some of those wheels may be drive wheels 23 and some of those wheels may be non-drive wheels 31. It will be appreciated that any configuration of drive 23 and non-drive wheels 31 may be used depending on the particular drive characteristics required by the vehicle 1.

The first power source 22 comprises a first drive shaft 23. The first power source 22 may be configured to cause the first drive shaft 23 to rotate about its axial direction. The rotation of the first drive shaft 23, due to its coupling to the wheels 23 of the vehicle 20, may cause the vehicle 20 to move. The first power source 22, in normal operation, may only be capable of causing the first drive shaft 23 to rotate in one rotational direction. E.g. in a forward direction but not in a reverse direction. This may be because the first power source is configured such that the first drive shaft 23 can only rotate in that one rotational direction when in normal operation. E.g. when the first power source is being instructed to generate a first power source torque. The first power source 23 may be configured to only generate a drive torque when causing the first drive shaft 23 to rotate in one rotational direction. In the case of an internal combustion engine, this occurs because the ignition of a combustion mixture inside the engine causes a crankshaft of the engine to rotate in one direction. The internal combustion engine is not capable of using the ignition of the combustion mixture to cause the crankshaft to rotate in the opposite rotational direction. Thus, an internal combustion engine in operation is only capable of rotating its drive shaft in one rotational direction. The first power source may be an electric motor that is only capable of developing the first power source torque when the first drive shaft 23 is rotating in one rotational direction. Thus, the first power source may be a single direction electric motor. It should be noted that whilst some single direction electrical machines may be capable of causing its drive shaft to rotate in an opposite rotational direction if given the correct inputs such single direction electrical machines tend to run non-optimally, may generate low power and/or may be dangerous to operate in such a way.

The drivetrain 21 also comprises a second power source 24. The second power source 24 may be coupled to at least one wheel of the vehicle 20 by other elements of the drivetrain 21 for the transference of a second power source torque, generated by the second power source 24, from the second power source 24 to the drive wheels 23 of the vehicle 20. The second power source 24 may be an electric motor configured to provide a drive torque and/or receive a drive torque.

The second power source 24 comprises a second drive shaft 25. The second power source 25 may be configured to cause the second drive shaft 25 to rotate about its axial direction. The rotation of the second drive shaft 25, due to its coupling to the wheels 23 of the vehicle 20, may cause the vehicle 20 to move. The second power source 23, in normal operation, may be capable of causing the second drive shaft 25 to rotate in both rotational directions. E.g. in both a forward direction and in a reverse direction. In the case of an electrical machine, this can occur because it can use electrical inputs to generate electromagnetic fields to cause a rotor that it coupled to the second drive shaft to rotate in either rotational direction. Thus, the second power source 24 may be a reversible direction electrical machine.

The vehicle may comprise one or more fuel stores 40. The fuel stores may be a fuel tank, or a battery.

The second power source 24 may be coupled to a transmission 26. The transmission may comprise an input shaft 27 and an output shaft 28. The second drive shaft 25 is coupled to the input shaft 27 of transmission 26. The input shaft 27 may also be known as the driven shaft 27 of the transmission 26. The transmission 26 may comprise one or more clutches to select how and when the input shaft 27 is connected to the output shaft 28. The transmission 26 may permit the selection between a plurality of gear ratios at which the input shaft 27 is connected to output shaft 28. The second power source 24 is coupled to the input shaft 27 of the transmission 26. The second drive shaft 24 of the second power source 24 may be coupled to the transmission 26 without the means of a clutch so that rotation of second drive shaft 24 always causes a rotation of the input shaft of the transmission 26. The second drive shaft 24 can be connected to the input shaft 27 of the transmission so that, in operation, the second drive shaft 24 is constantly capable of imparting a torque on the input shaft 27. As pictured, the second power source may be directly connected to the input shaft 27. Alternatively, the second power source may be connected by one or more gears. The second power source may be connected to the input shaft 27 by a transfer mechanism. The transfer mechanism may comprise one or more gears to transfer torque from the second power source to the input shaft 27. The transmission 26 may be any suitable transmission; for instance, the transmission 26 may be as described herein.

The output shaft 28 of the transmission 26 is coupled to drive wheels 23 by at least one differential 29. A vehicle may comprise more than one differential, for example, when the vehicle has more than two drive wheels. The differential 29 allows for independently variable rotational speeds of each of the drive wheels for a given input torque in dependence on the resistance presented by each drive wheel.

The drivetrain 21 also comprises a first clutch 30. The first clutch 30 controls the coupling of the first power source 22 to the second power source 25. In particular, the first clutch 30 controls the coupling of the first drive shaft to the second drive shaft. The first clutch 30 has a first mode in which the first clutch provides for torque transfer between the first drive shaft and the second drive shaft. E.g. when the first clutch is at least partially engaged and permits torque flow from one side of the first clutch 30 to the other side of first clutch 30. The first clutch 30 has a second mode in which the first clutch permits independent motion of the first drive shaft 23 and the second drive shaft 25. E.g. when the first clutch 30 is disengaged and does not permit torque flow from one side of the first clutch 30 to the other side of first clutch 30. Thus, when the first clutch is in the first mode the first power source 22 is connected to the transmission 26 by means of the second power source 25 being connected to the transmission 26. The first power source 22 can therefore cause the input shaft 27 of the transmission 26 to rotate when the first clutch 30 is in the first mode, but not when the first clutch 30 is in the second mode.

The arrangement of the first power source 22, first clutch 30 and second power source 24 so that the second power source is constantly connected to the transmission and the first power source is selectively connected to the transmission via the first clutch means that the vehicle can select whether the transmission, and thus the wheels, are driven by both the first power source and second power source or just the second power source. This is advantageous where the second power source 24 can generate a torque whilst rotating the second drive shaft 25 in either rotational direction, because it can mean that the second power source 24 can be used to drive the vehicle in both forward and reverse directions relative to the surface on which the vehicle rests. Stated differently, the second power source 24 can cause the output shaft 28 of the transmission 26, when the transmission 26 is in a mode where torque transfer is permitted between the input and output shafts 27, 28 of the transmission 26, to rotate in both rotational directions. Thus, the second power source can be used for both forward and reverse drive. As the first drive shaft 23 of the first power source 22 is only capable of being driven in one rotational direction, and not in the other rotational direction. The first power source 22 may resist its drive shaft being driven in the other rotational direction or may even inhibit the rotation of its drive shaft in the other rotational direction. Therefore, the presence of the first clutch 30 means that the first power source 22 can be disengaged from the second power source 25 and from the transmission 26 prior to the second power source 25 rotating in the other rotational direction.

The above configuration is advantageous because it means that transmission 26 does not need to be equipped with a mechanism that permits the rotational direction of the input shaft 27 relative to the output shaft 28 to be reversed. Stated differently, transmission 26 may be provided with only forward gears. I.e. gears that all cause the output shaft 28 to rotate in one rotational direction for a given rotation of the input shaft 27 in a particular rotational direction. This means that the transmission 26 needs at least one fewer gearings in the transmission which thus reduces the length of the transmission, or permits the substitution of the reverse gearing for another forward gearing.

Within the body 32 of the vehicle 20 is a seat 33 for a driver. When a driver is sat in the seat 20 he can reach a throttle pedal 34 with his foot. The throttle pedal is pivotable about its rearmost end relative to the body of the vehicle. Its forward end is biased upwardly by spring 35 to an uppermost position where it hits a stop, and can be pressed down by the driver's foot to a lowermost position where it hits another stop. The pedal is thus constrained to be movable only between the uppermost position ("0%") and the lowermost position ("100%"). A position detector 36 is attached to the pedal and senses the angle of deflection of the pedal. It will be appreciated that other throttle controls could be used instead of the throttle pedal 34 to gather the target drive demand from the drivetrain 21 of the vehicle requested by the driver. For instance, the vehicle could comprise a hand operated control as a throttle control. The vehicle may also calculate the target drive demand autonomously, for example, by means of an adaptive cruise control system.

When the driver is sat in the seat 20 he can also reach a gear selector with his hand. The gear selector 36 permits the driver to indicate a desired gear ratio for the transmission 26.

The gear selector 36 may enable the driver to select a gear ratio one higher or one lower than the current gear ratio of the transmission 26. The gear selector may also be configured to permit the driver to select an automatic mode of operation for the transmission where the current gear ratio between the input shaft 27 and the output shaft 28 is selected by the vehicle 20 in dependence on the current operating conditions of the vehicle. For instance, the speed, current drive demand and/or the torque required to fulfil that drive demand. The gear selector may also be configured to permit the drive to select a reverse drive mode in which the vehicle is capable of moving in a reverse direction to the normal motion direction of the vehicle. The normal motion direction may be the direction in which the driver faces when sitting in seat 33.

The operation of the vehicle is regulated by a Vehicle Control Unit (VCU) 37. The VCU 37 comprises a processor 38 and a non-volatile memory 39. The VCU 37 may comprise more than one processor 38 and more than one memory 39. The memory 39 stores a set of program instructions that are executable by the processor, and reference data such as look-up tables that can be referenced by the processor in response to those instructions. The processor 38 may be configured to operate in accordance with a computer program stored in non-transitory form on a machine readable storage medium. The computer program may store instructions for causing the processor to perform the operations of the VCU 37 in the manner described herein.

The VCU 37 may be formed of a number of control units, such an Engine Control Unit, Power Source Control Unit, Gearbox Control Unit, and/or Dynamics Control Unit.

The VCU 37 is coupled to the position detector 23 to receive from it the detected position of the throttle pedal 34. The VCU 37 is coupled to the power sources 22, 24 to receive from them data relating to the operation of the power sources 22, 24. For instance, the current RPM of the power sources, operating temperature and/or operating parameters. The VCU 37 also transmits to the power sources 22, 24 control information that regulates the operation of the power sources 22, 24. That control information could, for example, include the amount of fuel and/or air to be charged in each inlet stroke, valve and ignition timings, turbo boost level, output power level, and other data relating to the control of an electrical machine.

The VCU 37 is also coupled to first clutch 30 to control the connection between the first power source 22 and the second power source 25.

The program instructions stored by the memory define a mechanism whereby the VCU 37 can determine a set of output parameters for controlling the power sources 22, 24 and first clutch 30 in response to a set of input parameters it has received and/or computed. In the present example, the VCU may follow a two-stage process to determine the output parameters. First, in response to at least some of the input parameters (including, for example, throttle position and a representation of throttle direction) the VCU determines a target drive demand from the power sources 22, 24. The drive demand can conveniently be a torque demand, but it could be expressed in other ways such as power demand or fuel used per unit time. Second, using a pre-stored model of the behaviour of the power sources the VCU determines the outputs needed to cause the power sources 22, 24 to satisfy that drive demand. It then transmits those outputs to the power sources 22, 24 and to first clutch 30 to cause the power sources 22, 24 and first clutch 30 to behave in accordance with the computed drive demand. These stages are repeated frequently: typically 20 or more times per second, to generate a series of output values reflecting up-to-date input values.

The VCU 37 may therefore select which of the first and second power sources 22, 24 are to drive the vehicle at any given time. This selection is made, in part, using first clutch 30. If the VCU determines that the vehicle needs to reverse, the VCU may be configured to (i) cause the first clutch 30 to disengage the first power source from the second power source by causing the first clutch to enter the second mode where independent motion of the first drive shaft 23 and second drive shaft 25 is permitted, and (ii) cause the second power source to rotate in one rotational direction which causes the output of the transmission to rotate in a rotational direction that causes the vehicle to reverse. The VCU 37 may determine the vehicle needs to reverse based on inputs received from the gear selector 36 or in response to an autonomous driving mode deciding it needs to reverse. If the VCU 37 determines that the vehicle needs to move in a forwards direction, the VCU 37 may be configured to select between (i) the second power source 24 driving the transmission 26 on its own (with first clutch in the second mode), (ii) the second power source 24 driving the transmission 26 in conjunction with the first power source 22 (with first clutch in the first mode), and/or (iii) the first power source 22 driving the transmission 26 and second power source 22 either idling or drawing power from first power source 22. The VCU 37 may select between these different modes depending on the drive demand and also the operating mode of the vehicle (e.g. if it is operating in a power saving mode or in a high performance mode).

Figure 3:
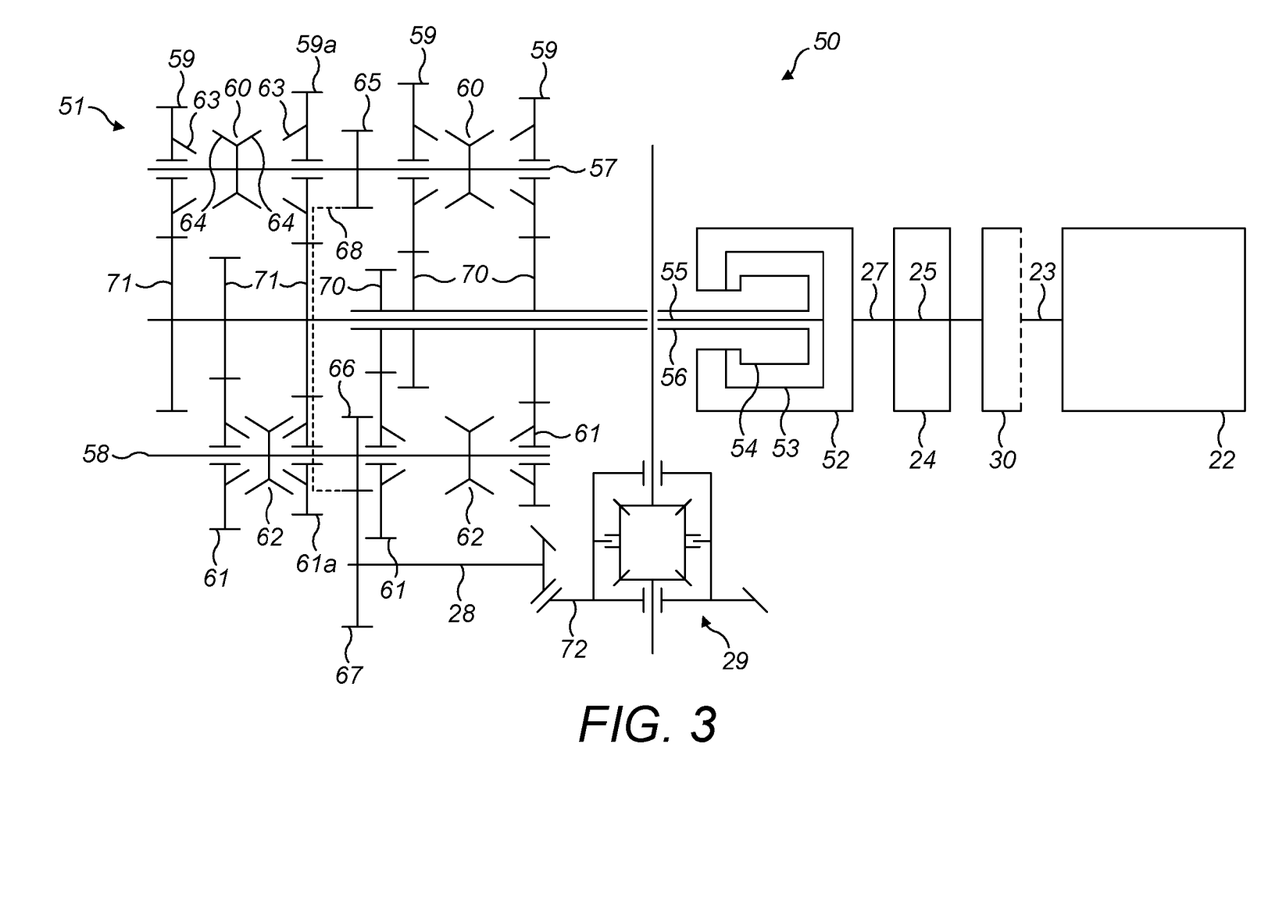
FIG. 3 shows a schematic drawing of a drivetrain for a vehicle.

FIG. 3 shows a drivetrain 50. As described with reference to FIG. 2, the drivetrain 50 comprises a first power source 22, second power source 24, first clutch 30, and transmission 26. An example gearbox 51 that could be used as the transmission 26 will now be described with reference to FIG. 3.

Gearbox 51 comprises an input shaft 27 and an output shaft 28. Input shaft 27 is connected to second power source 24 and first clutch 30. Input shaft 27 is connected to a clutch housing 52 so that the clutch housing rotates with the input shaft 27. Gearbox 51 comprises a pair of main clutches 52, 53. The pair of main clutches 52, 53 are contained in the clutch housing. The main clutches are arranged so that they can be actuated independently to couple the input shaft 27 to either an inner intermediate shaft 55 or an outer intermediate shaft 56. The inner intermediate shaft 55 runs concentrically within the outer intermediate shaft 56.

The gearbox 51 comprises two lay shafts 57, 58. First lay shaft 57 carries a first set of drive gears 59. Each drive gear 59 of the first set of drive gears 59 can rotate freely about the first lay shaft 57 or can be coupled to the first lay shaft 57 by a coupling mechanism 60. Second lay shaft 58 carries a second set of drive gears 61. Each drive gear of the second set of drive gears 61 can rotate freely about the second lay shaft 58 or can be coupled to the second lay shaft 58 by a coupling mechanism 62.

Each coupling mechanism 60, 62 having a first mode in which the coupling mechanism 60, 62 couples a drive gear 59, 61 to a lay shaft 57, 58 so that the drive gear 59, 61 rotates with the lay shaft 57, 58 and a second mode in which the coupling mechanism 60, 62 permits the drive gear to rotate freely about the lay shaft 57, 58. Conveniently, each coupling mechanism 60, 62 could be a dog clutch, optionally with a synchromesh mechanism to facilitate it being engaged. A coupling mechanism 60, 62 may be shared between a pair of drive gears 59, 61 as illustrated in FIG. 3. The coupling mechanism 60, 62 may therefore have three modes:

- A first mode in which the coupling mechanism 60, 62 couples a first drive gear 59, 61 of a set of drive gears 59, 61 to the respective lay shaft 57, 58 and permits a second drive gear 59, 61 of the same set of drive gears 59, 61 to rotate freely about the lay shaft 57, 58.
- A second mode in which the coupling mechanism 60, 62 permits both first and second drive gears 59, 61 of the set of drive gears to rotate freely about the lay shaft 57, 58.
- A third mode in which the coupling mechanism 60, 62 couples the second drive gear 59, 61 of the set of drive gears 59, 61 to the respective lay shaft and permits the first drive gear 59, 61 of the set of drive gears 59, 61 to rotate freely about the lay shaft 57, 58.

In the example illustrated in FIG. 3, dog clutches operate between the lay shaft 59, 61 and a pair of the drive gears 59, 61. The dog clutches have a pair of toothed rings 63, 64 associated with each drive gear 59, 61 which can be set so as to mate with each other or to be free of each other. Toothed rings 64 are rotationally fast with the layshaft 57, 58. Toothed rings 63 are rotationally fast with the drive gears 59, 61. The dog clutches, and thus also the coupling mechanisms, can be moved between their modes by selectors (not shown).

Each of the first and second lay shafts 57, 58 are coupled to the output shaft by respective output gears 65, 66. A first output gear 65 is carried by first lay shaft 57. A second output gear 66 is carried by second lay shaft 58. A third output gear 67 is carried by output shaft 28. Third output gear 67 meshes with the first and second output gears 65, 66. Each output gear 65, 65, 67 is rotationally fast with its respective shaft 57, 58, 28. Thus, when a lay shaft rotates so does the output shaft. The connection between first output gear 65 and third output gear 67 is shown by dotted line 68 because in practice output shaft 28 and third output gear 67 would be offset from the plane in which the figure is drawn to permit connection between the third output gear 67 and the first and second output gears 65, 66.

The outer intermediate shaft 56 carries a first set of shaft gears 70. The shaft gears 70 each mesh with a respective one drive gear 59, 61 of the first and second sets of drive gears 59, 61. The shaft gears 70 may mesh with a drive gear of the first set of drive gears 59 and a drive gear of the second set of drive gears 61 as shown by drive gears 59a and 61a. Such a configuration reduces the length of the gearbox 51 by reducing the number of shaft gears 70 that are required to connect with the sets of drive gears. The shaft gears may be rotationally fast with the outer intermediate shaft 56.

The inner intermediate shaft 55 carries a second set of shaft gears 71. The shaft gears 71 each mesh with a respective one drive gear 59, 61 of the first and second sets of drive gears 59, 61. The shaft gears 71 may mesh with a drive gear of the first set of drive gears 59 and a drive gear of the second set of drive gears 61 as shown by drive gears 59a and 61a. Again, such a configuration reduces the length of the gearbox 51 by reducing the number of shaft gears 71 that are required to connect with the sets of drive gears. The shaft gears may be rotationally fast with the inner intermediate shaft 55.

The ratios provided by first set of shaft gears 70 and drive gears 59, 61 in combination implement a first set of gear ratios between the input shaft 27 and output shaft 28. A selected one of those gear ratios can be implemented by actuating first main clutch 53 so as to couple the input shaft 27 to the inner intermediate shaft 55 and by actuating one of the coupling mechanisms 60, 61 so as to couple the appropriate one of the drive gears 59, 61 to one of the lay shafts 57, 58. Similarly, outer intermediate shaft 56 can implement a second set of gear ratios between the input shaft 27 and output shaft 28 by actuating second main clutch 54 so as to couple the input shaft 27 to the inner intermediate shaft 56 and by actuating one of the coupling mechanisms 60, 61 so as to couple the appropriate one of the drive gears 59, 61 to one of the lay shafts 57, 58. Successive gear ratios alternate between the first set and the second set so that, for example, the inner intermediate shaft provides odd gear ratios and the outer intermediate shaft carries even gear ratios.

In the gearbox 51 shown in FIG. 3, no reversing gears are provided therefore all of the gear ratios provided by the gearbox have the same rotational relationship between the input shaft and output shaft. They could all be described as forward gears. I.e. for a given rotation direction of the input shaft the output shaft always rotates in the same rotation direction irrespective of the gear ratio chosen. None of the gear ratios may be provided with a reversing gear. The input shaft and output shaft may always rotate in the same rotational direction or opposite rotation direction irrespective of the gear ratio chosen depending on the gearing provided inside the gearbox 51.

The gearbox 51 is advantageous when combined with the first and second power sources because no reverse gear is required when using the first and second power sources as the second power source can drive the vehicle in reverse and so the gearbox can be shorter because it does not require a reverse gear, or the space on the shafts that was occupied by a reverse gear can be occupied instead by another forward gear.

The first and second output gears 65, 66 carried by first and second lay shafts 57, 58 respectively are positioned along their respective lay shafts between two of the drive gears on each shaft. The first and second output gears 65, 66 may be positioned along their respective lay shafts 57, 58 so that there are an equal number of drive gears to each side of the output gears. The first output gear and second output gear may each have a different number of drive gears to each side of them. This may occur where the gearbox has an odd number of gear ratios and so the intermediate shafts each have a different number of shaft gears.

The first and second sets of drive gears 59, 61 may be split into two groups: a first group that are coupled to the first set of shaft gears 70 carried by the outer intermediate shaft 56 and a second group that are coupled to the second set of shaft gears 71 carried by the inner intermediate shaft 55. The first and second output gears 65, 66 may be positioned on their respective lay shaft in between the first group and the second group of shaft gears.

At least some of the drive gears may share a coupling mechanism 60 between a pair of drive gears. One or both of the output gears 65, 66 may be positioned along its respective lay shaft 57, 58 so as not to be between any of those pairs of drive gears. The output gears 65, 66 may have at least one pair of drive gears that share a common coupling mechanism to each side of the output gear 65, 66 along its respective lay shaft 57, 58.

As shown in FIG. 3, the gearbox may have eight gear ratios. Four of those gear ratios being provided by the coupling of drive gears on first lay shaft 57 with shaft gears on the intermediate shafts 55, 56 and four of those gear ratios being provided by the coupling of drive gears on second lay shaft 58 with shaft gears on the intermediate shafts 55 56. The drive gears on first lay shaft 57 are divided into pairs with each pair being coupled to and disengaged from the first lay shaft by a respective coupling mechanism 60. The drive gears on second lay shaft 58 are divided into pairs with each pair being coupled to and disengaged from the second lay shaft 58 by a respective coupling mechanism. This means there are half as many coupling mechanisms as drive gears per lay shaft. The output gear 65, 66 of each lay shaft is positioned along the output gear's respective lay shaft 57, 58 in between the pairs of drive gears 59, 61 so as to have one pair of drive gears 59, 61 to each side of each output gear.

This position means that the overall length of the drivetrain 50 can be made more compact because the connection from the output shaft 28 to the drive wheels can be positioned closer to the portion of the gearbox housing the lay shafts rather than requiring its own space in the drivetrain 50. This is especially advantageous in mid-engine vehicles where the gearbox is usually placed over or behind the rear axle of the vehicle. Thus, the ability to move the connection between the output shaft 28 of the gearbox 51 closer to the gearbox and thus to the rear of the vehicle can improves the ability to package the drivetrain 50 within the vehicle. This is particularly true where the input shaft 27 and output shaft 28 accept a connection from the same direction.

In the case shown in FIG. 3, the input shaft 27 and output shaft 28 accept a connection to other drivetrain components in the same direction. Coupled to the output shaft 28 is a differential 29. The position of the output gears 65, 66, 67 between the drive gears 59, 61 means that the differential 29 can be packaged closer to the drive gears at the end of the lay shafts closest to where the input and output shafts 27, 28 accept a connection. The crown wheel 72 of the differential 29 may be positioned so that it cuts through a plane defined by the drive gears at end of the lay shafts closest to where the input and output shafts 27, 28 accept a connection. This positioning reduces the overall length of the gearbox 51 and differential 29 package.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A gearbox comprising:
an outer intermediate shaft carrying a first set of shaft gears;
an inner intermediate shaft carrying a second set of shaft gears, the inner intermediate shaft running concentrically within the outer intermediate shaft; and
a first lay shaft carrying a first set of drive gears and an output gear positioned along the first lay shaft between two of the first set of drive gears, a second lay shaft carrying a second set of drive gears and an output gear positioned along the second lay shaft between two of the second set of drive gears, each drive gear being coupled to a respective shaft gear to together provide a plurality of gear ratios between the intermediate shafts and an output shaft; wherein:
each lay shaft is coupled to the output shaft by the respective output gear; and
the output shaft is for connection to a differential, and a crown wheel of the differential is positioned so that it cuts through a plane positioned on two of the drive gears at the end of the first and second layshafts closest to where the input shaft is removably coupled to the inner and outer intermediate shafts.

2. The gearbox as claimed in claim 1, wherein the output gears of the first and second lay shafts are positioned so that the drive gears of the first and second sets that are coupled to shaft gears carried by the outer intermediate shaft are to one side, along the respective lay shaft, of the output gears of the first and second lay shafts and the drive gears of the first and second sets that are coupled to shaft gears carried by the inner intermediate shaft are to the other side, along the respective lay shaft, of the output gears of the first and second lay shafts.

3. The gearbox as claimed in claim 1, the gearbox comprising at least two drive gears to each side of the output gear of the first lay shaft.

4. The gearbox as claimed in claim 1, the gearbox comprising at least two drive gears to each side of the output gear of the second lay shaft.

5. The gearbox as claimed in claim 1, the gearbox comprising a plurality of coupling mechanisms.

6. The gearbox as claimed in claim 5, wherein the coupling mechanisms are configured to selectively couple at least one respective drive gear to the lay shaft of the drive gear.

7. The gearbox as claimed in claim 5, wherein the coupling mechanisms have a first mode in which the coupling mechanism couples a respective first drive gear to the lay shaft that carries the drive gear, and a second mode in which the coupling mechanism permits the first drive gear to rotate freely about the lay shaft.

8. The gearbox as claimed in claim 7, wherein at least one coupling mechanism has a third mode in which the coupling mechanism couples a respective second drive gear to the lay shaft that carries the first drive gear and permits the first drive gear to rotate freely about the lay shaft, and the first mode permits the second drive gear to rotate freely about the lay shaft.

9. The gearbox as claimed in claim 8, wherein the output gears of the first and second lay shafts are positioned so that the output gears are not between two drive gears being selectively coupled to the respective lay shaft by a common coupling mechanism.

10. The gearbox as claimed in claim 5, wherein at least two drive gears on a lay shaft share a common coupling mechanism for selectively coupling the two drive gears to the layshaft.

11. The gearbox as claimed in claim 10, wherein the drive gears on the first lay shaft are divided into pairs and each pair shares a common coupling mechanism for selectively coupling the drive gears to the first lay shaft.

12. The gearbox as claimed in claim 10, wherein the drive gears on the second lay shaft are divided into pairs and each pair shares a common coupling mechanism for selectively coupling the drive gears to the second lay shaft.

13. The gearbox as claimed in claim 1, wherein the first set of shaft gears are coupled to respective drive gears to provide a first set of gear ratios of the plurality of gear ratios, and the second set of shaft gears are coupled to respective drive gears to provide a second set of gear ratios of the plurality of gear ratios.

14. The gearbox as claimed in claim 13, wherein successive gear ratios alternate between the first set of gear ratios and the second set of gear ratios.

15. The gearbox as claimed in claim 1, wherein each of the plurality of gear ratios has the same rotational relationship between a rotation of the intermediate shafts and a rotation of the output shaft.

16. The gearbox as claimed in claim 1, wherein a rotation of each intermediate shaft in one rotational direction causes the output shaft to rotate in the same rotational direction at each of the plurality of gear ratios.

17. The gearbox as claimed in claim 16, wherein the rotation of each intermediate shaft in a first rotational direction causes the output shaft to rotate in an opposite direction to the first rotational direction at each of the plurality of gear ratios.

18. The gearbox as claimed in claim 1, wherein the output shaft is coupled to an output gear, and the output gear of the output shaft is coupled to each of the output gears of the first and second lay shafts.

19. The gearbox as claimed in claim 1, the gearbox comprising:
an input shaft;
a first main clutch having a first mode in which the first main clutch provides for positive torque transfer from the input shaft to the outer intermediate shaft and a second mode in which the first main clutch permits independent motion of the input shaft and the outer intermediate shaft; and
a second main clutch having a first mode in which the second main clutch provides for positive torque transfer from the input shaft to the inner intermediate shaft and a second mode in which the second main clutch permits independent motion of the input shaft and the inner intermediate shaft.

20. A vehicle comprising:
a transmission comprising an input shaft configured to rotate in a first rotational direction and second rotational direction opposite to the first rotational direction;
a first power source comprising a first drive shaft, the first power source being configured to cause the first drive shaft to rotate in a third rotational direction;
a second power source comprising a second drive shaft coupled to the input shaft, the second power source being configured to cause the second drive shaft to rotate in the third rotational direction and a fourth rotational direction opposite to the third rotational direction; and
a gearbox comprising:
an outer intermediate shaft carrying a first set of shaft gears;
an inner intermediate shaft carrying a second set of shaft gears, the inner intermediate shaft running concentrically within the outer intermediate shaft; and
a first lay shaft carrying a first set of drive gears and an output gear positioned along the first lay shaft between two of the first set of drive gears, a second lay shaft carrying a second set of drive gears and an output gear positioned along the second lay shaft between two of the second set of drive gears, each drive gear being coupled to a respective shaft gear to together provide a plurality of gear ratios between the intermediate shafts and an output shaft; wherein:
each lay shaft is coupled to the output shaft by the respective output gear; and
the output shaft is for connection to a differential, and a crown wheel of the differential is positioned so that it cuts through a plane positioned on two of the drive gears at the end of the first and second layshafts closest to where the input shaft is removably coupled to the inner and outer intermediate shafts; and
a first clutch having a first mode in which the first clutch provides for torque transfer between the first drive shaft and the second drive shaft and a second mode in which the first clutch permits independent motion of the first drive shaft and the second drive shaft;
wherein the vehicle is configured to cause the first clutch to enter the first mode to permit the first power source to cause the input shaft to rotate in the first rotational direction, and cause the first clutch to enter the second mode to permit the second power source to cause the input shaft to rotate in the second rotational direction.

* * * * *